No. 608,851. Patented Aug. 9, 1898.
T. FOSTER.
ROLLER TOOTH VARIABLE GEAR.
(Application filed Oct. 28, 1897.)
(No Model.)
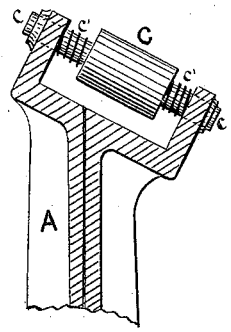
FIG 4
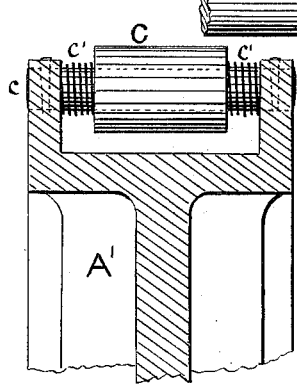
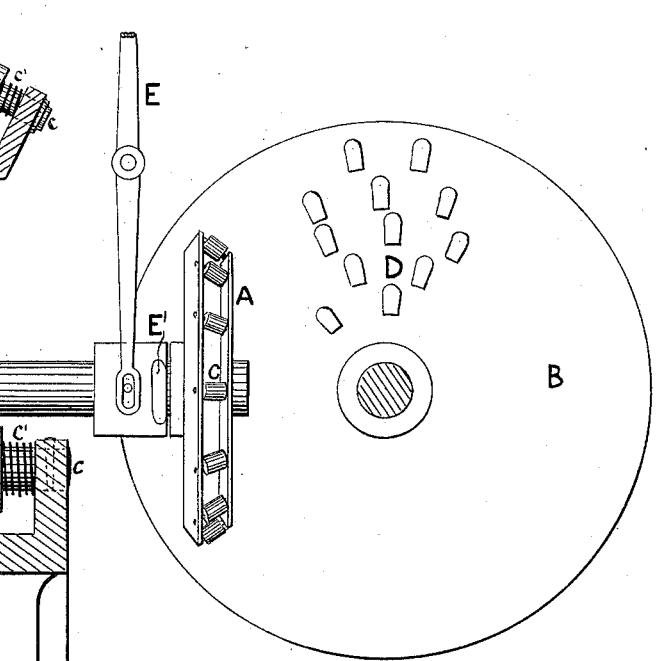
FIG 1
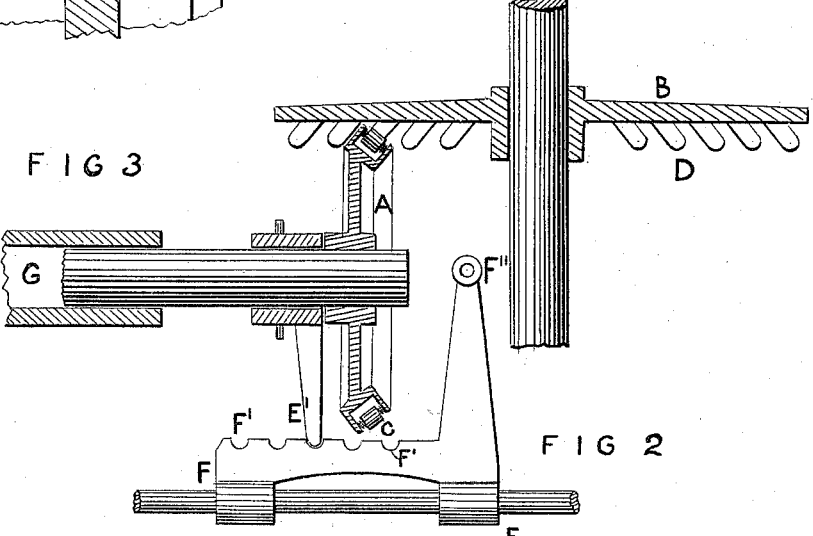
FIG 3
FIG 2
Witnesses.
Henton Macaulay Davey
Charles Edwin Davey
Inventor.
Thomas Foster

UNITED STATES PATENT OFFICE.

THOMAS FOSTER, OF DUNEDIN, NEW ZEALAND.

ROLLER-TOOTH VARIABLE GEAR.

SPECIFICATION forming part of Letters Patent No. 608,851, dated August 9, 1898.

Application filed October 28, 1897. Serial No. 656,668. (No model.)

*To all whom it may concern:*

Be it known that I, THOMAS FOSTER, book-finisher, of 31 Moray Place, in the city of Dunedin, in the British Colony of New Zealand, a subject of the Queen of Great Britain, have invented new and useful Improvements in Gearing called "Roller-Tooth Variable Gear," of which the following is a specification.

The objects of this invention are to produce a gear that can be applied to spur or bevel tooth wheels, such as are in use for any purpose, and also to arrange such gearing that a change of speeds can be obtained by a simple movement and in some cases without a stoppage of the machinery. In cases where this change of speeds is adapted to motor-cars, bicycles, or the like passengers can alter the gear without getting down for the purpose. For ordinary gearing one wheel is practically the same as is now in use. The other is formed up as a lantern-wheel; but the bars are provided with rollers rather shorter than the bars on which they revolve. At one or both ends of the rollers and between their ends and the shrouding of the wheel there are light springs for the purpose of keeping the rollers in the middle of the bars on which they turn. These correct any end thrust or friction between the rollers and the shrouding, which is specially needed in bevel-wheels, where the thrust is generally outward, but may be inward when wheels that have been turning idly come into activity when the teeth are in a straight line with each other. In variable gear one wheel, preferably the roller-wheel, is fitted to a flexible or telescopic shaft, so that it can either be sprung out of gear for shifting, or the back-bearing may be on a joint or swivel for the same purpose. The wheel engages to teeth, and as many concentric rows as needed of such teeth will be in the crown-wheel, which will be flat, convex, or concave, as the direction of the shaft of the shifting wheel lies, so that the face of the crown-wheel is parallel to that shaft. When the required gear is engaged, the shifting wheel is locked or secured from getting out of gear.

Referring to the accompanying drawings, Figure 1 is an elevation of a right-angle variable gear; and Fig. 2 is a plan of the same, showing the locking device. Fig. 3 is a part section of the roller-tooth as applied to any spur-gearing, and Fig. 4 as applied to bevel-gearing.

A is any bevel-wheel fitted with the roller-gear, and A' is any spur-wheel so fitted.

B is a crown-wheel fitted with rows of teeth preferably at an angle outward, as shown, for engaging the roller-teeth of the wheel A.

C are the roller-teeth, consisting of rollers running on bars c, the spaces between the ends of the rollers C and the shrouding of the wheel being fitted with a light spring at each end c' c' for keeping C in a central position to avoid friction with the shrouding of the wheel and allow for any thrusting action.

D are rows of teeth on the wheel B.

E is any lever arrangement for shifting A to any of the rows of teeth D D in the wheel B.

E' is a projection engaging notches in a device F, and F' F' are the notches.

F'' is an arm which, lifted, disengages E' from F' and allows A to come away out of gear, as explained, when the lever E shifts A to the required row of teeth, when it is locked by F F' F'' being lowered to the position shown.

G is any suitable support for the shaft of the gear H to enable said shaft to slide on the gear A.

An alternative method of fixing the roller-teeth is shown in Fig. 4, where the roller-teeth are in one with the bars and run in the shrouding of the wheel.

I am aware that roller-teeth are in use; but I am not aware that anything approaching my invention is in use.

Having described my invention, what I claim, and desire to obtain by Letters Patent of the United States, is—

1. In combination, the crown-wheel having the series of rows of teeth, and a shifting wheel A having a housing and the teeth with springs between the end of the teeth and the housing to keep the teeth centrally thereof, while allowing the teeth to slide laterally when in contact with the teeth of the crown-wheel, substantially as described.

2. In combination in a variable-speed gearing, a wheel A carrying the shrouding and the rollers forming the teeth of the said wheel, said rollers being arranged to shift laterally of the wheel with the springs for holding the roller in position, substantially as described.

THOMAS FOSTER.

Witnesses:
    HENTON MACAULAY DAVEY,
    CHARLES EDWIN DAVEY.